(12) United States Patent
Lee et al.

(10) Patent No.: US 8,345,167 B2
(45) Date of Patent: Jan. 1, 2013

(54) METHODS OF STORING AND ACCESSING PICTURES

(75) Inventors: Kun-Bin Lee, Taipei (TW); Yuan-Chung Lee, Tai-Nan (TW)

(73) Assignee: MediaTek Inc., Hsin-Chu Hsien (TW)

( * ) Notice: Subject to any disclaimer, the term of this patent is extended or adjusted under 35 U.S.C. 154(b) by 1211 days.

(21) Appl. No.: 11/276,967

(22) Filed: Mar. 20, 2006

(65) Prior Publication Data

US 2007/0217756 A1  Sep. 20, 2007

(51) Int. Cl.
*H04N 9/64* (2006.01)
(52) U.S. Cl. ......................... 348/715; 348/718
(58) Field of Classification Search .......... 348/714–716, 348/448–452, 459; 345/200, 196
See application file for complete search history.

(56) References Cited

U.S. PATENT DOCUMENTS

| 4,956,708 | A | * | 9/1990 | Itagaki | 348/441 |
| 5,406,311 | A | * | 4/1995 | Michelson | 345/547 |
| 6,134,640 | A | | 10/2000 | Unno | |
| 6,502,179 | B2 | | 12/2002 | Kondo | |
| 6,980,733 | B2 | * | 12/2005 | Numata | 386/131 |
| 7,702,878 | B2 | | 4/2010 | MacInnis | |
| 2004/0061704 | A1 | * | 4/2004 | Ju et al. | 345/564 |
| 2005/0162566 | A1 | | 7/2005 | Chuang | |

* cited by examiner

*Primary Examiner* — Michael Lee
(74) *Attorney, Agent, or Firm* — Winston Hsu; Scott Margo

(57) ABSTRACT

A method of storing and accessing pictures in a multi-field video operation includes storing a first portion of a first field in first page of a first bank of a DRAM; storing a first portion of a second field in the first page of the first bank; reading the first page of the first bank; and performing the multi-field video operation according to the first portions of the first field and the second field. Another method includes storing a first field in a first bank of a DRAM; storing a second field in a second bank of the DRAM; reading a first portion of the first field from the first bank of the DRAM and reading a first portion of the second field from the second bank of the DRAM; and performing the multi-field video operation according to the first portions of the first field and the second field.

24 Claims, 18 Drawing Sheets

METHODS OF STORING AND ACCESSING PICTURES

BACKGROUND

The invention relates to storing pictures into a memory and subsequently accessing the pictures, and more particularly, to efficiently storing and accessing pictures in multi-field video operations to reduce system cost.

There has been a rapid evolution from analog video technology to digital video technology because of the advantages that digital video has to offer. Digital video can be stored and distributed more cheaply than analog video because digital video can be stored on randomly accessible media such as magnetic disc drives (hard disks) and optical disc media known as compact discs (CDs). Once stored on a randomly accessible media, digital video may become interactive, allowing it to be used in games, catalogs, training, education, and other applications.

One of the newest products to be based on digital video technology is the digital video disc, sometimes called "digital versatile disc" or simply "DVD." These discs are the size of an audio CD, yet hold up to 17 billion bytes of data, 26 times the data on an audio CD. DVD storage capacity (17 Gbyte) is much higher than CD-ROM (600 Mbyte) and a DVD can deliver the data at a higher rate than CD-ROM. Therefore, DVD technology represents a tremendous improvement in video and audio quality over traditional systems such as televisions, VCRs and CD-ROM.

However, a major problem in utilizing DVD and other digital video technology to display motion pictures is that the sources of motion pictures come at different frame speeds. For example, standard film is shot at a rate of 24 Hz while a television broadcast using the National Television System Committee (NTSC) standard updates motion at 60 Hz. Converting the motion picture into digital video through a process called scan-rate conversion often produces a noticeable reduction in resolution as well as distortions known as motion artifacts.

Deinterlacing processes are used for video scan-rate converting, and an exemplary application of deinterlacing is used in TV systems as a reverse process for interlacing. To transmit a video signal in an "interlaced" format (or read the signal in interlaced format from memory), One kind of methods is that the odd field of each frame is transmitted (or read) before the even field of the frame. In other words, all the odd-numbered active video lines of the frame are transmitted (or read) before any of the even-numbered active video lines are transmitted (or read). When a video signal in such interlaced format is displayed on a video monitor, all of the odd lines appear on the monitor before any of the even lines appears on the monitor.

To transmit (or read) a video signal in a "progressive" format, the active video lines of a frame are transmitted (read) in consecutive order (line "1," followed by line "2," followed by line "3," and so on). When a progressive-format signal is displayed on a video monitor, the lines appear on the screen in this same consecutive order (with an odd line appearing immediately before each even line).

Therefore, the above mentioned deinterlacing is a very important image format transformation process. Generally speaking, high quality deinterlacing functions always require the use of a large amount of memory and high memory bandwidth. Because, in the deinterlacing process, it is possibly required to store a large amount of field picture data, cost effective memory components such as dynamic random access memories (DRAM) are often utilized. Note, either off-chip DRAMs or embedded DRAMs are both commonly employed for deinterlacing. Furthermore, because access of large sized DRAMs may result in memory system congestion, system designers are typically required to use higher speed DRAM devices, or to use a system with other memory modules with larger amounts of local buffering support to pre-fetch or temporarily store data of the memory to prevent temporary loss of data access.

FIG. 1 shows how four fields 101, 102, 103, 104 are utilized to complete deinterlacing according to a typical deinterlacing process. The deinterlacing process needs to use data for at least one field picture to produce a frame picture. For example, in FIG. 1, data of four field pictures 101, 102, 103, 104 is required to be passed to a deinterlacing unit for further processing.

FIG. 2 shows how the data of the four fields 101, 102, 103, 104 of FIG. 1 are typically stored in a memory 200. As mentioned, traditionally speaking, the deinterlacing process requires taking a plurality of field pictures and providing a linear mapping method to store these field pictures in a memory such as a DRAM. A raster scan method can be utilized to read the data from the memory for transfer into a deinterlacing unit for further processing.

A typical deinterlacing unit includes a plurality of local line buffers to store current pixel data that is required to be used during the deinterlacing process. Different field data is then alternatively transferred into the local line buffers of the deinterlacing unit from the memory 200 throughout the deinterlacing process. For example, a portion of the data of a first field 101 will first be transferred to a local line buffer, then data of a second field 102, third field 103, and fourth filed 104 is sequentially transferred to the local line buffers. Afterwards, new data from the first field 101 is transferred into the line buffer and the process repeats. This type of alternating access of data of different fields while moving the data into the local line buffers means that it is very easy to encounter DRAM page misses while accessing the DRAM memory 200. As the probability of page misses increases, the efficiency of DRAM bandwidth usage is reduced. This results in the efficiency of the entire system also being degraded, and of the actual time required by the deinterlacing process to complete to be further extended. For example, experiments show that losses due to one time DDR DRAM page miss can reach 10%-75%, which mainly depends on data bus widths and burst lengths. In DDR2 DRAM, one page miss can further reach to 33.3%-250%.

SUMMARY OF THE INVENTION

One objective of the claimed invention is therefore to provide a method of storing and accessing pictures in multi-field video operations, to alleviate the above-mentioned problems.

According to an exemplary embodiment of the claimed invention, a method of storing and accessing pictures in a multi-field video operation is disclosed. The method comprises providing a dynamic random access memory (DRAM); storing a first portion of a first field in first page of a first bank of the DRAM; storing a first portion of a second field in the first page of the first bank; reading data from the first page of the first bank; and performing the multi-field video operation according to the first portion of the first field and the first portion of the second field.

According to another exemplary embodiment of the claimed invention, a method of storing and accessing pictures in a multi-field video operation is disclosed. The method comprises providing a dynamic random access memory (DRAM); storing a first field in a first bank of the DRAM;

storing a second field in a second bank of the DRAM; reading a first portion of the first field from the first bank of the DRAM and reading a first portion of the second field from the second bank of the DRAM; and performing the multi-field video operation according to the first portion of the first field and the first portion of the second field.

In some embodiments of the method for accessing pictures in a multi-field video operation, data stored into or read from the same page of a bank for performing the multi-field video operation is accessed at once before accessing another page or another bank. In some embodiments, two or more banks are accessed sequentially before accessing a different page of the currently accessed bank.

According to another exemplary embodiment of the claimed invention, a method for storing n-bit data comprising dividing an n-bit datum into a plurality of parts including at least a first part and a second part, each part having at least one bit or a plurality of bits being a multiple of two; storing the first part into a first memory word; and storing the second part into a second memory word.

These and other objectives of the present invention will no doubt become obvious to those of ordinary skill in the art after reading the following detailed description of the preferred embodiment that is illustrated in the various figures and drawings.

DETAILED DESCRIPTION

An improved method of memory storage for use in common 3-dimensional (3D) motion-adaptive deinterlacing, 3D comb filtering, or temporal noise reduction, etc operations requiring storing large amounts of field pictures data is disclosed according to the present invention. In a first aspect of the present invention, by advantageously utilizing different banks and pages of dynamic random access memory (DRAM) to store sections of video field pictures, effective usable bandwidth of the DRAM is increased and system costs are reduced. Additionally, in a second aspect of the present invention, data having a length being not equal to a multiple of 8 is broken into different length data pieces, and separately stored into memory. In this way, accessing data becomes more convenient. The aspects of the present invention can be utilized together for the above described multi-field operations and to improve other image processing functions such as encoding and decoding.

Figure 3:
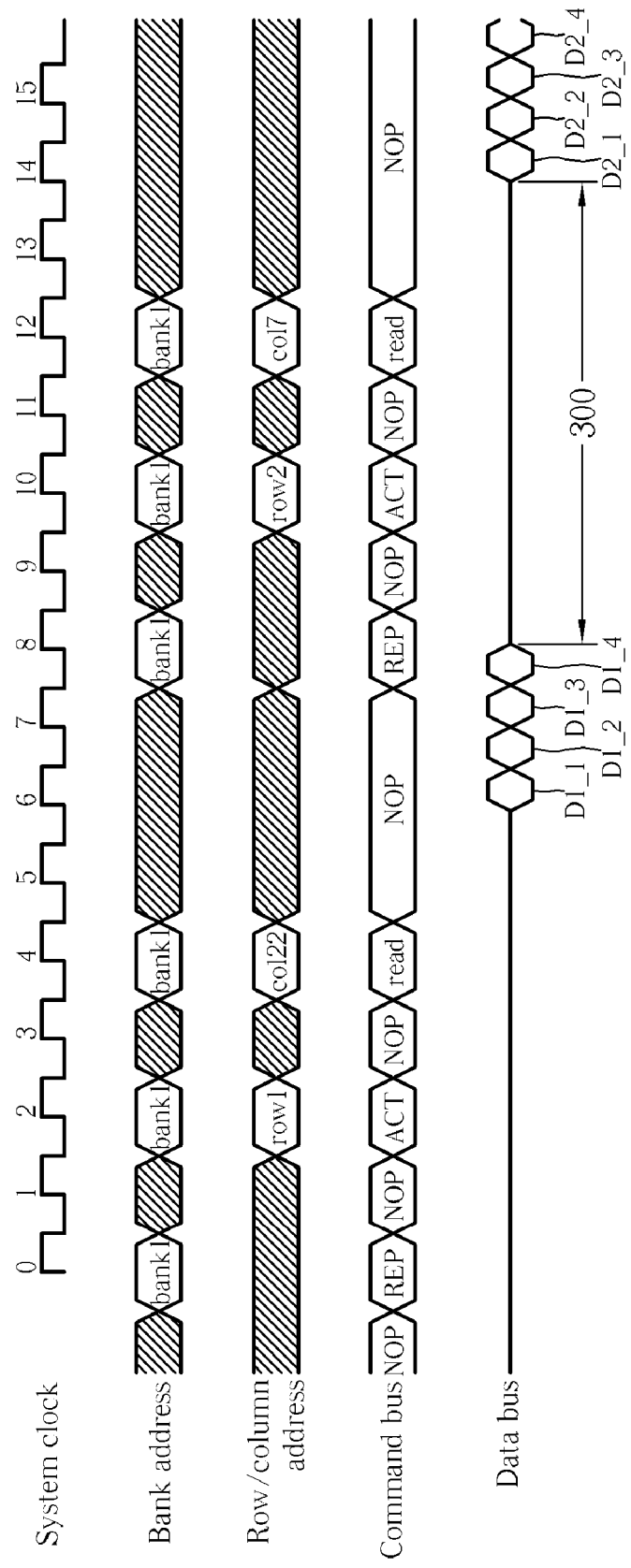
FIG. 3 shows a simplified timing diagram illustrating the latency of a typical two DRAM burst accesses in different page of the DRAM resulting in a page miss.
Figure 4:
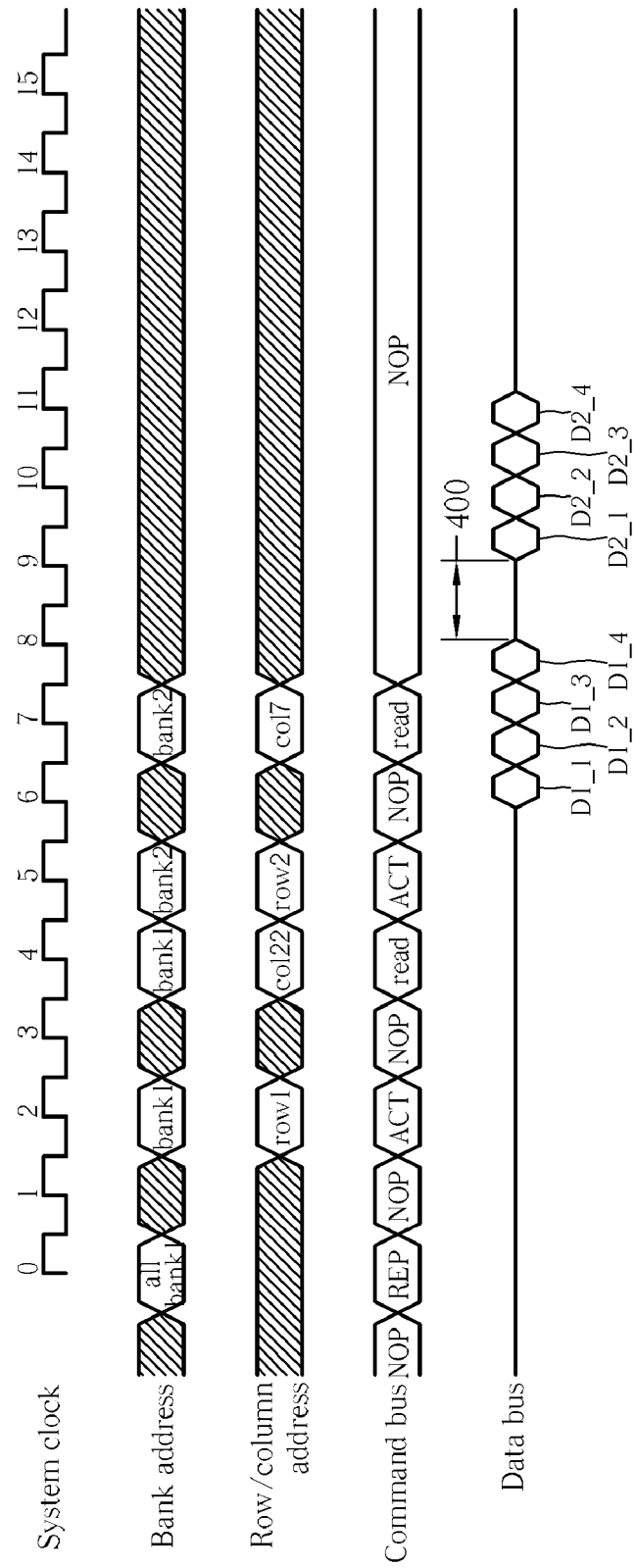
FIG. 4 shows a simplified timing diagram illustrating the latency of a typically two DRAM burst accesses in different banks of the DRAM.

FIG. 3 shows a latency simplified timing diagram of a typical two DRAM burst accesses different pages of the same bank. As shown in FIG. 3, when a page miss occurs, a time delay 300 is required after reading a first data set (D1_1 . . . D1_4) from the data bus and before reading a second data set (D2_1 . . . D2_4) from the data bus. FIG. 4 shows a latency simplified timing diagram of a typically two DRAM burst accesses in different banks of the DRAM. As shown in FIG. 4, when the second data set (D2_1 . . . D2_4) is read from a different bank of the DRAM, a greatly shortened time delay 400 is required after reading a first data set (D1_1 . . . D1_4) from the data bus and before reading a second data set (D2_1 . . . D2_4) from the data bus. This is due to the fact that DRAM must be pre-charged with the same bank 1 in FIG. 3. Because the page miss situation of FIG. 3 causes the time delay 300 to be much longer than the time delay 400, it is clearly advantageous to avoid page miss situations whenever possible when utilizing DRAM memory.

Figure 5:
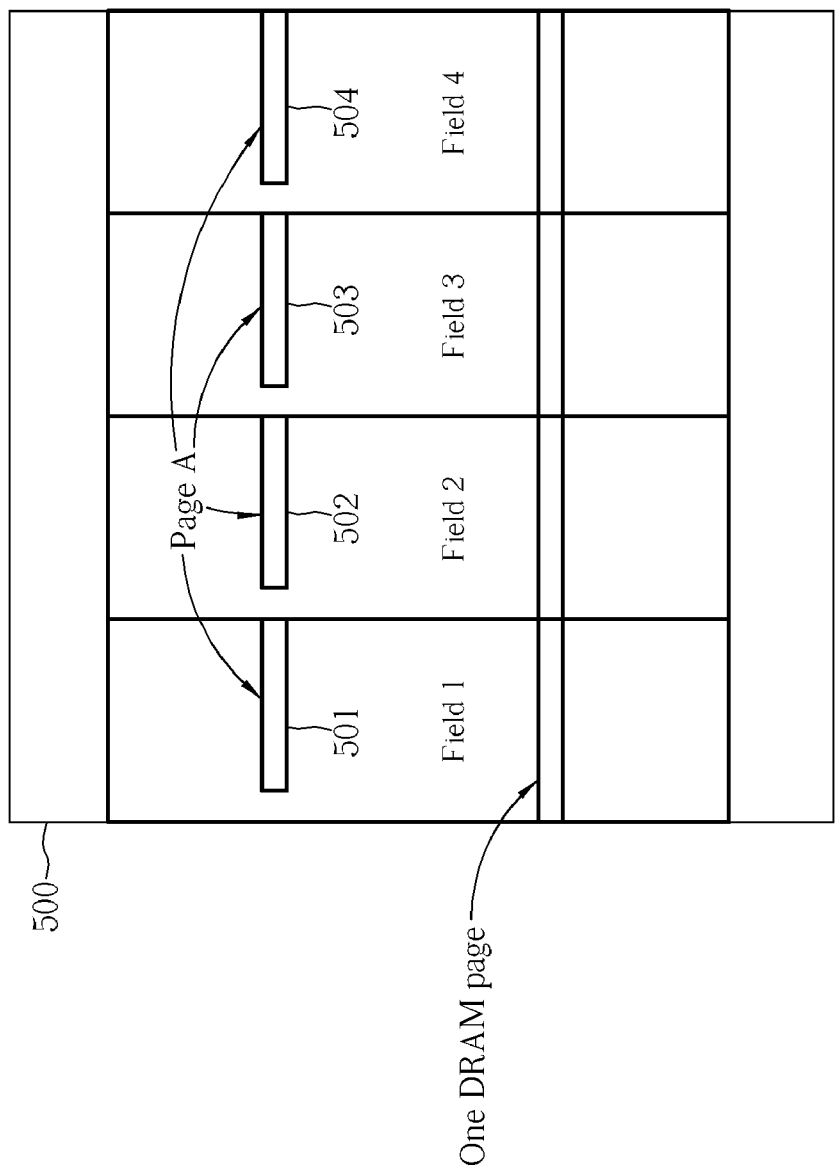
FIG. 5 shows a memory organization when accessing sections of data for a plurality of fields from a DRAM memory according to a first exemplary embodiment.

FIG. 5 shows a first memory organization when storing sections or portions of data for a plurality of fields in a DRAM memory according to a first exemplary embodiment. In this embodiment, the memory organization of FIG. 5 is used to overcome the reduced efficiency caused by memory page misses. Although the following description is made using four field pictures 501, 502, 503, 504 to perform deinterlacing as an example, the present invention can also easily be adapted for use with other numbers of field pictures. Currently DRAM typically includes a plurality of banks, but this embodiment only demonstrates a method of accessing one bank of the DRAM. The other embodiments having multiple banks provided in the following description access a bank at a time. General speaking, each DRAM page may have 512-4K entries, where each entry has 4 bits-16 bits, and the width of each picture may be 720 pixels. (For example, 480i/576i.) It should be noted that with respect to the present invention, the picture height in the following description is not important. Due to design constraints, if only one of the banks is used, then sections of the field pictures 501, 502, 503, 504 may be organized as shown in FIG. 5 within the DRAM memory.

Figure 1:
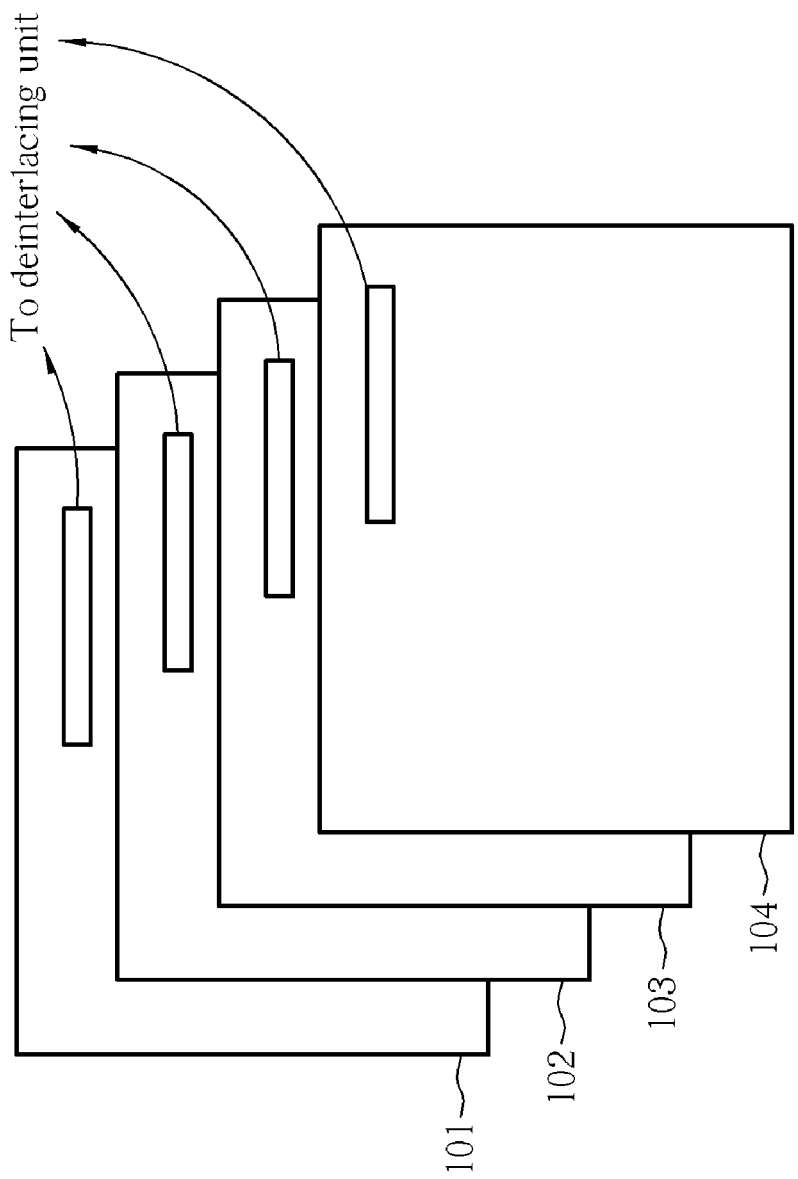
FIG. 1 shows an example of how four fields are required to complete deinterlacing according to a typical deinterlacing process.
Figure 2:
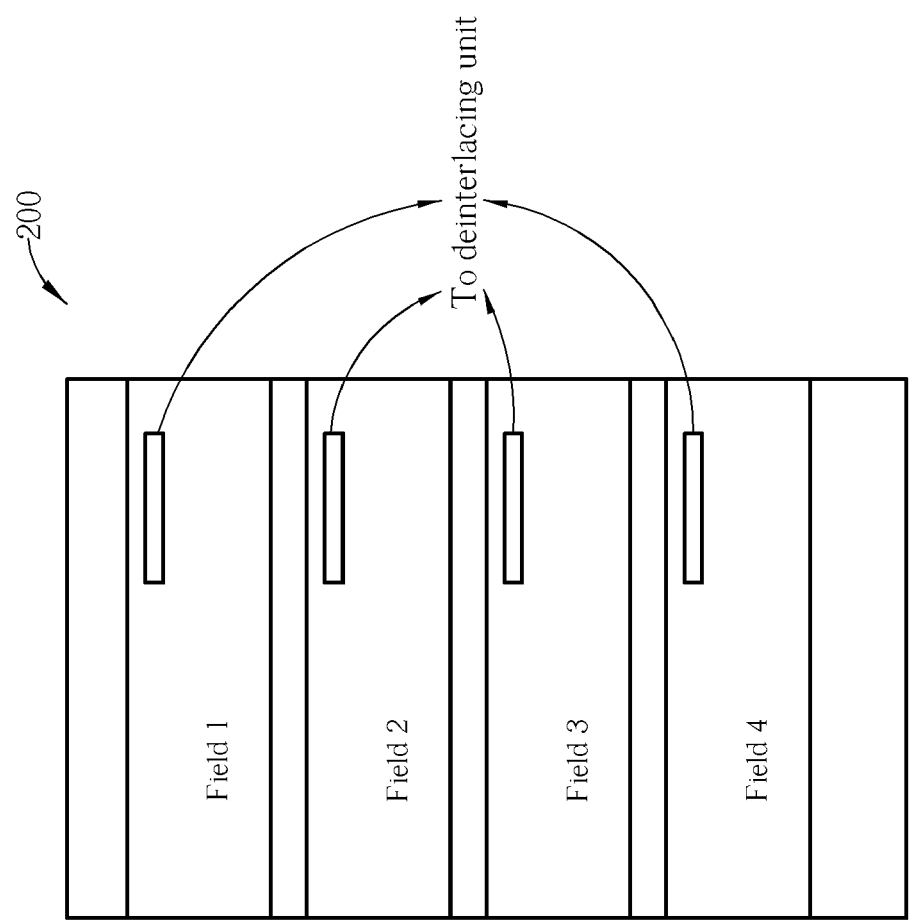
FIG. 2 shows an example of how the data of the four fields of FIG. 1 are typically stored in a memory.

When comparing the memory organization of FIG. 5 to the memory organization of FIG. 2, each DRAM page in FIG. 2 only includes data of one field. However, in this embodiment, as shown in FIG. 5, the same memory page includes data of the four fields 501, 502, 503, 504. Because reading the data of these four fields involves reading the same page of memory, this organization reduces the DRAM page misses.

Figure 6:
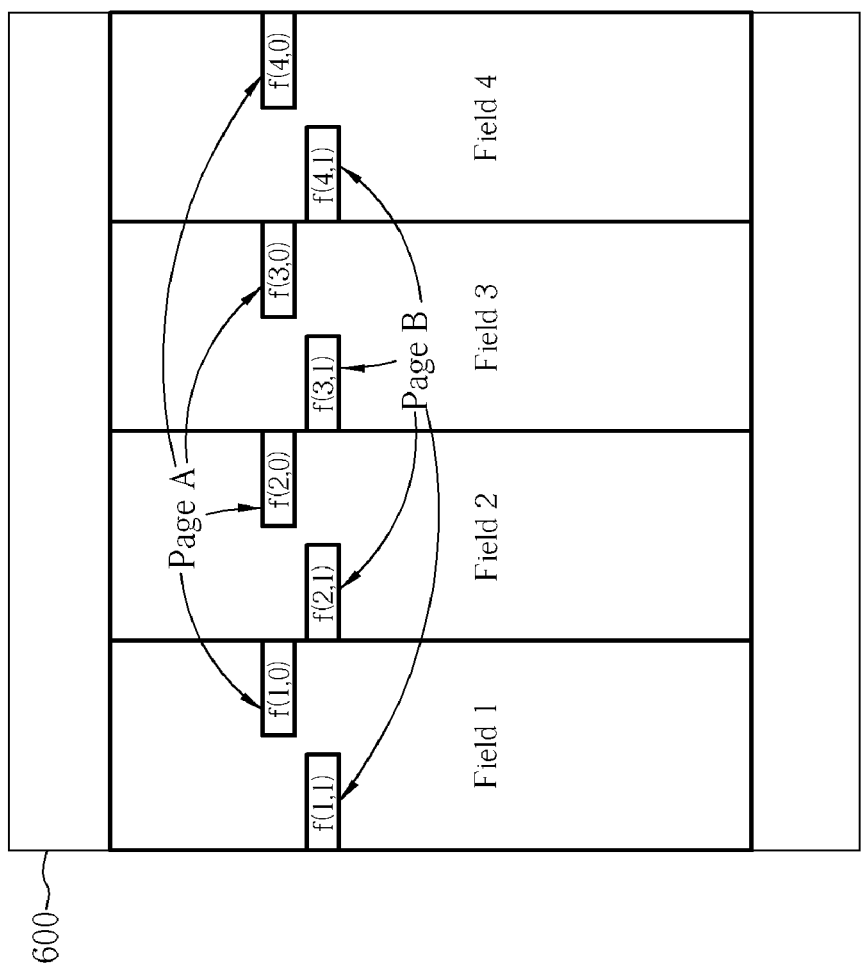
FIG. 6 shows a memory organization when accessing sections of data for a plurality of fields from a DRAM memory according to a second exemplary embodiment.

FIG. 6 shows a second memory organization when storing sections of data for a plurality of fields in a DRAM memory according to a second exemplary embodiment. In some situations, as shown in FIG. 6, originally reading a certain field will cause a page miss situation to occur. It should also be noted that the exemplary memory organizations of the present invention are different from the conventional memory organizations, as the conventional memory organization may have the last section data of a particular field picture and the first section of another field picture stored in the same memory page, while remaining parts of these two field pictures are not stored together in another memory page. The provided exemplary memory organization stores a portion of each field picture in the same page, so that corresponding portions of the field pictures may be accessed from one page to avoid extensive page miss. In situations such as the one shown in FIG. 6, the data of other fields in this page should first be read before changing a page, and then the remaining data of the field is read out of a new page. That is, the data accessing order should be: f(1,0)→f(2,0)→f(3,0)→f(4,0)→f(1, 1)→f(2, 1)→f(3, 1)→f(4, 1), where for a particular data section f(a,b), 'a' represents field picture a, and 'b' represents section b of field picture a. Please note, f(a,b) and f(a,b+1) may or may not be overlapping, and the size of section b in any two fields f(p,b) and f(q,b) may not be the same. These variations depend on the deinterlacing algorithm.

Figure 7:
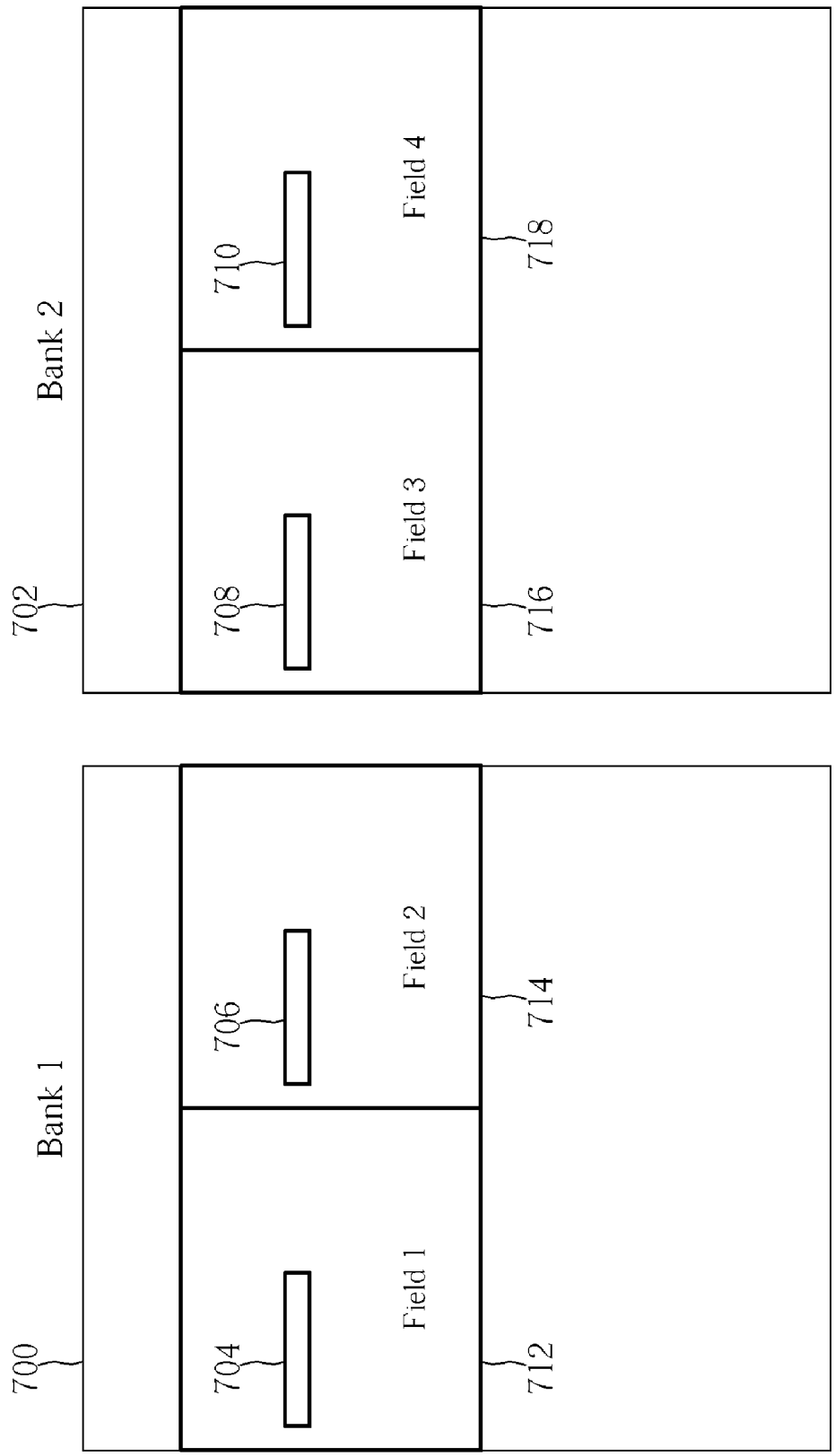
FIG. 7 shows a memory organization when accessing sections of data for a plurality of fields from a DRAM memory according to third exemplary embodiment.
Figure 8:
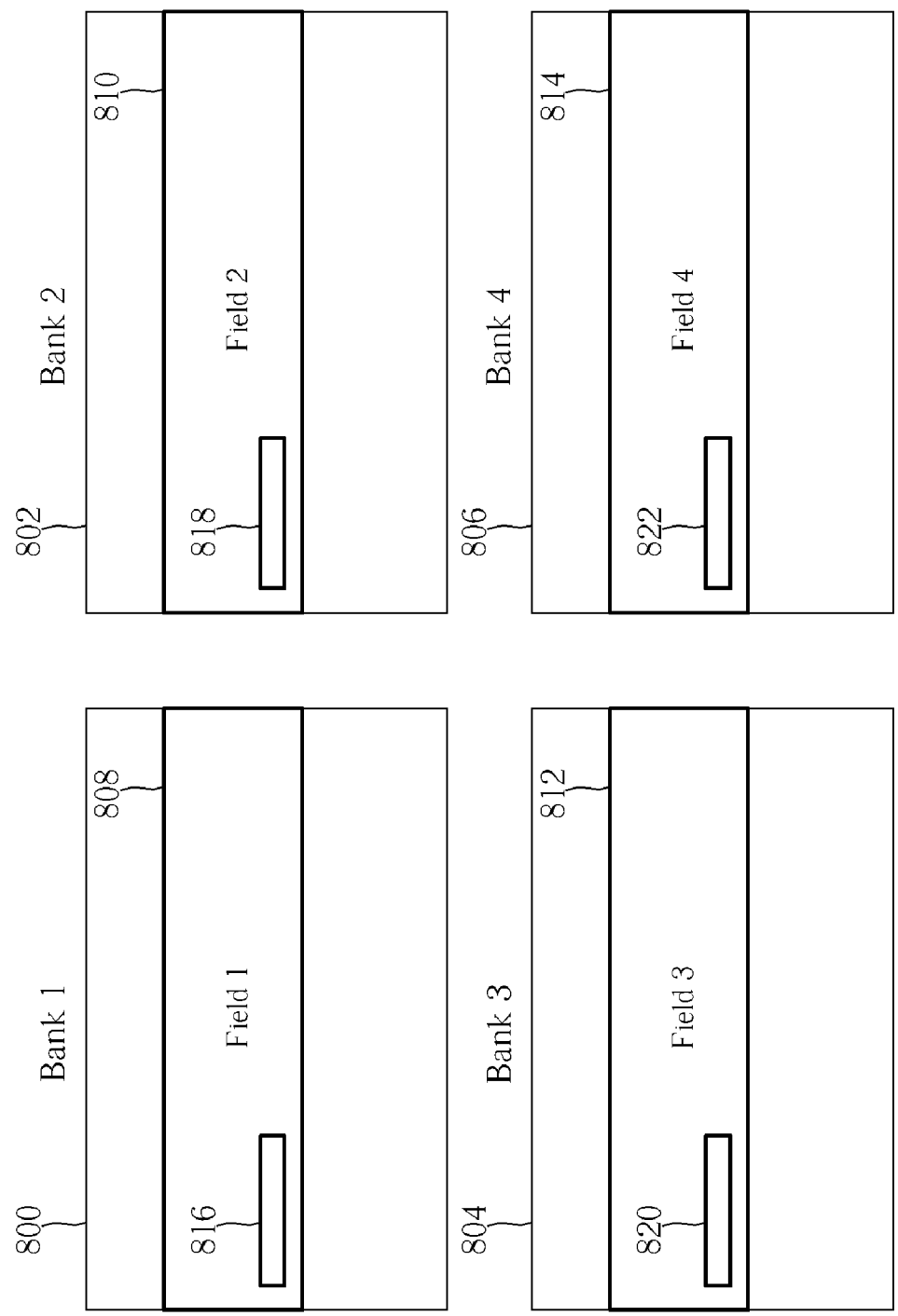
FIG. 8 shows a memory organization when accessing sections of data for a plurality of fields from a DRAM memory according to fourth exemplary embodiment.
Figure 9:
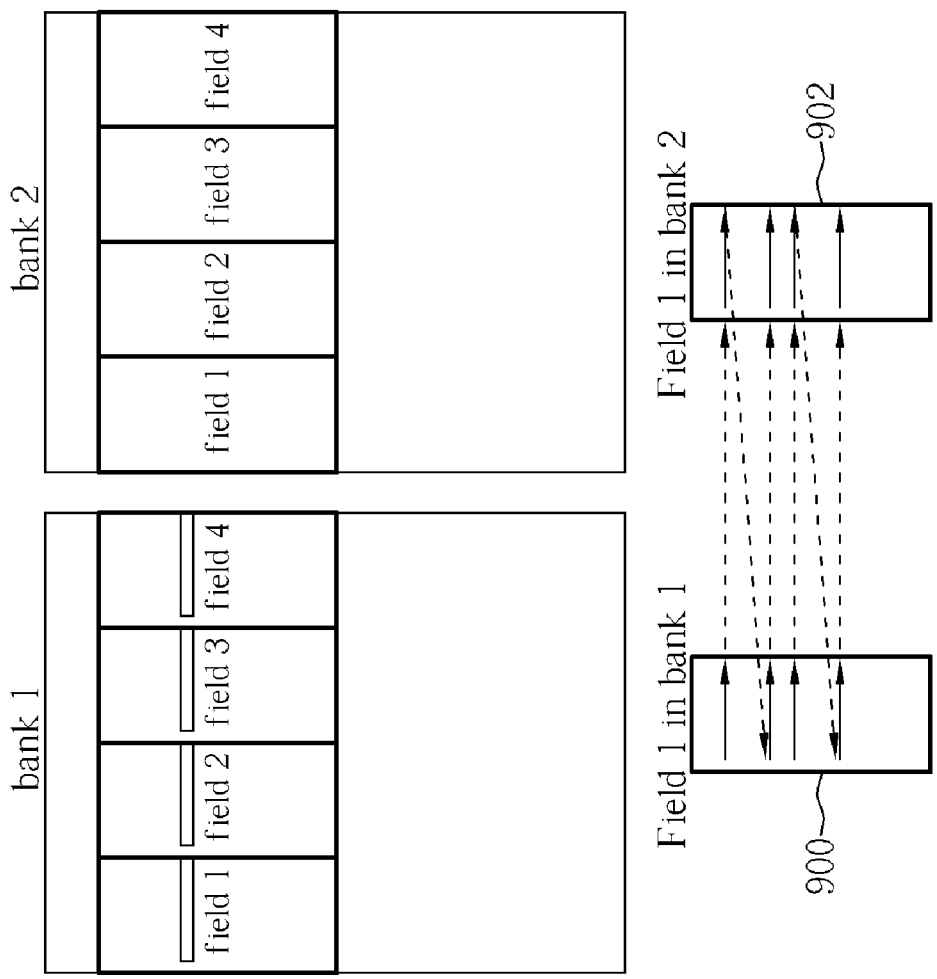
FIG. 9 shows an accessing order when storing or reading sections of data for a plurality of fields in/from a DRAM memory according to fifth exemplary embodiment.

FIG. 7, FIG. 8, and FIG. 9 show memory organizations when storing sections of data for a plurality of fields in a DRAM memory according to third, fourth, and fifth exemplary embodiments, respectively. If there are a plurality of DRAM memory banks that can be used, then data can be stored in the banks as shown in FIG. 7, FIG. 8, FIG. 9.

In FIG. 7, two memory banks 700, 702 are available for use by the multi-field operation. As shown in FIG. 7, a first field 712 is stored horizontally adjacent to a second field 714 in the first bank 700. In this way, when reading a particular row of the first field containing a data section (or portion) 704, the corresponding row of the second field containing data section 706 will also be read. Likewise, in the second bank 702, a third field 716 is stored horizontally adjacent to a fourth field 718 in the second bank 702. In this way, when reading a particular row of the third field 716 containing a data section 708, the corresponding row of the fourth field 718 containing data section 710 will also be read. The two sections 704 and 706 are in the same page of Bank 1 (700), and the two sections 708 and 710 are in the same page of Bank 2 (702), so that long delay due to page miss can be avoided when accessing these four sections.

In FIG. 8, four memory banks 800, 802, 804, 806 are available for use by the multi-field operation. As shown in FIG. 8, a first field 808 is stored within the first bank 800 and utilizing the full width of the first bank 800, a second field 810 is stored within the second bank 802 and utilizing the full width of the second bank 802, a third field 812 is stored within the third bank 812 and utilizing the full width of the third bank 804, and a fourth field 814 is stored within the fourth bank 806 and utilizing the full width of the fourth bank 806.

FIG. 9 shows how a particular field can be stored across a plurality of banks according to an embodiment of the present invention. In this example, the data of a particular field is stored across a first bank 900 and a second bank 902 and is accessed from these banks in turn. When performing data accessing operations, before switching to a different page in the same bank, other fields of the same page are first accessed. Afterwards, the bank can be switched to the second bank 902 and the remaining portion of the particular field can be read. It should be noted that FIG. 9 shows two banks as an example; according to different embodiments, the fields can also be separated into more memory banks. For example, into 3, or 4 memory banks etc.

Figure 10:
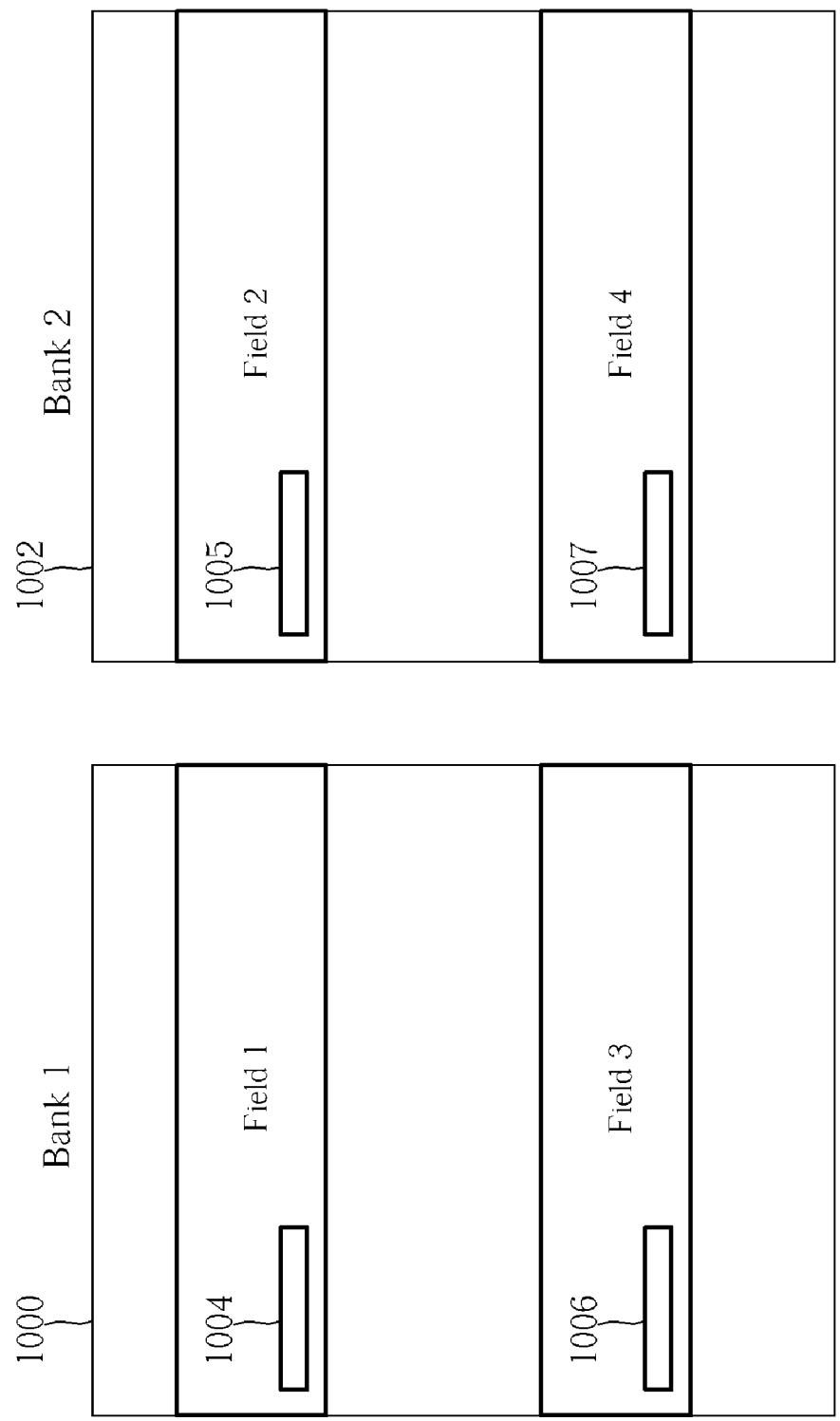
FIG. 10 shows another memory organization according to another embodiment of the present invention.

FIG. 10 shows another memory organization according to another embodiment of the present invention. In this embodiment, only two banks 1000, 1002 are required so this configuration is an improvement over the memory organization of FIG. 8, which utilizes too many banks. However, the memory organization of FIG. 10 has increased limitations. In particular, fields that are stored into the same bank should not be accessed in succession. For instance, in the example shown in FIG. 10, it is preferred to access the fields in the following order: field 1->field 2->field 3->field 4. If the fields need to be read in another order such as: field 1->field 3->field 2->field 4, then there will be two page misses. Note that in FIG. 10, fields that are put into the same DRAM memory bank can be adjacent to each other and need not have a separation as shown in FIG. 10.

Figure 11:
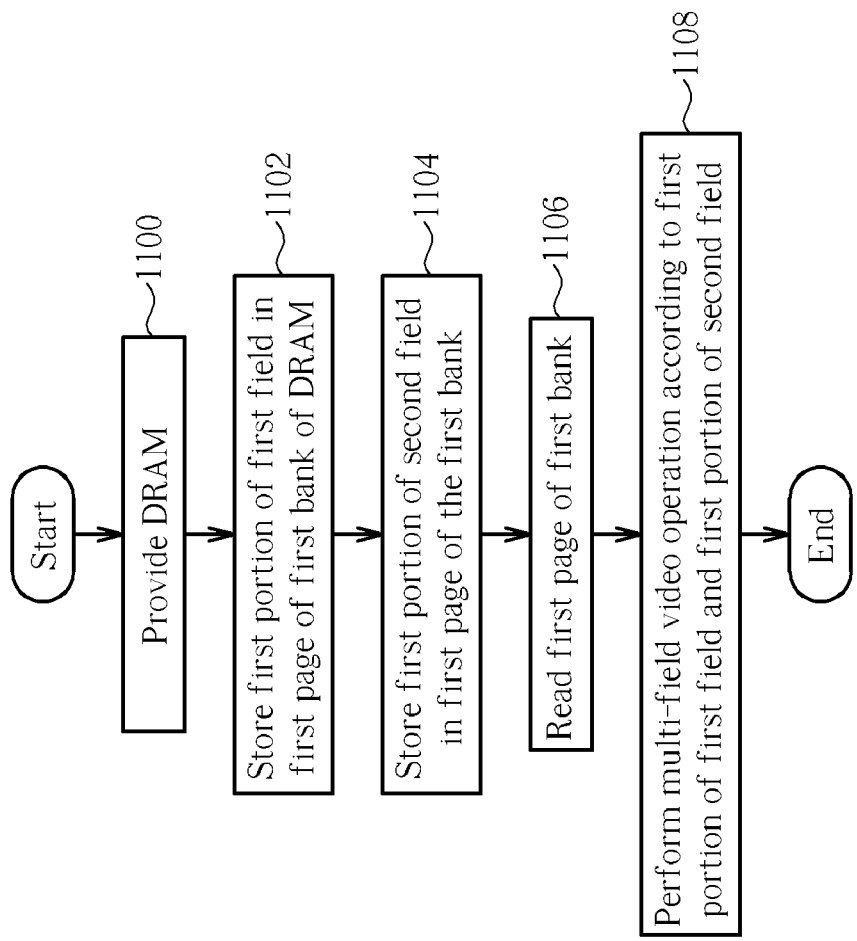
FIG. 11 shows a flowchart of storing and accessing pictures in multi-field video operations according to an embodiment of the present invention.

FIG. 11 shows a method of storing and accessing pictures in multi-field video operations according to simplified embodiments of the present invention shown in FIG. 5 and FIG. 6. Two fields instead of four are used to illustrate the embodiments shown in FIGS. 11 and 12. Provided that substantially the same result is achieved, the steps of the flowchart in FIG. 11 need not be in the exact order shown and need not be contiguous, that is, other steps can be intermediate. According to these embodiments, storing and accessing pictures in multi-field video operation includes the following steps:

Step 1100: Provide a dynamic random access memory (DRAM).

Step 1102: Store a first field in a first bank of the DRAM.

Step 1104: Store a second field in the first bank.

Step 1106: Read the first page of the first bank to acquire a first portion of the first field and a first portion of the second field.

Step 1108: Perform the multi-field video operation according to the first portion of the first field and the first portion of the second field.

Figure 12:
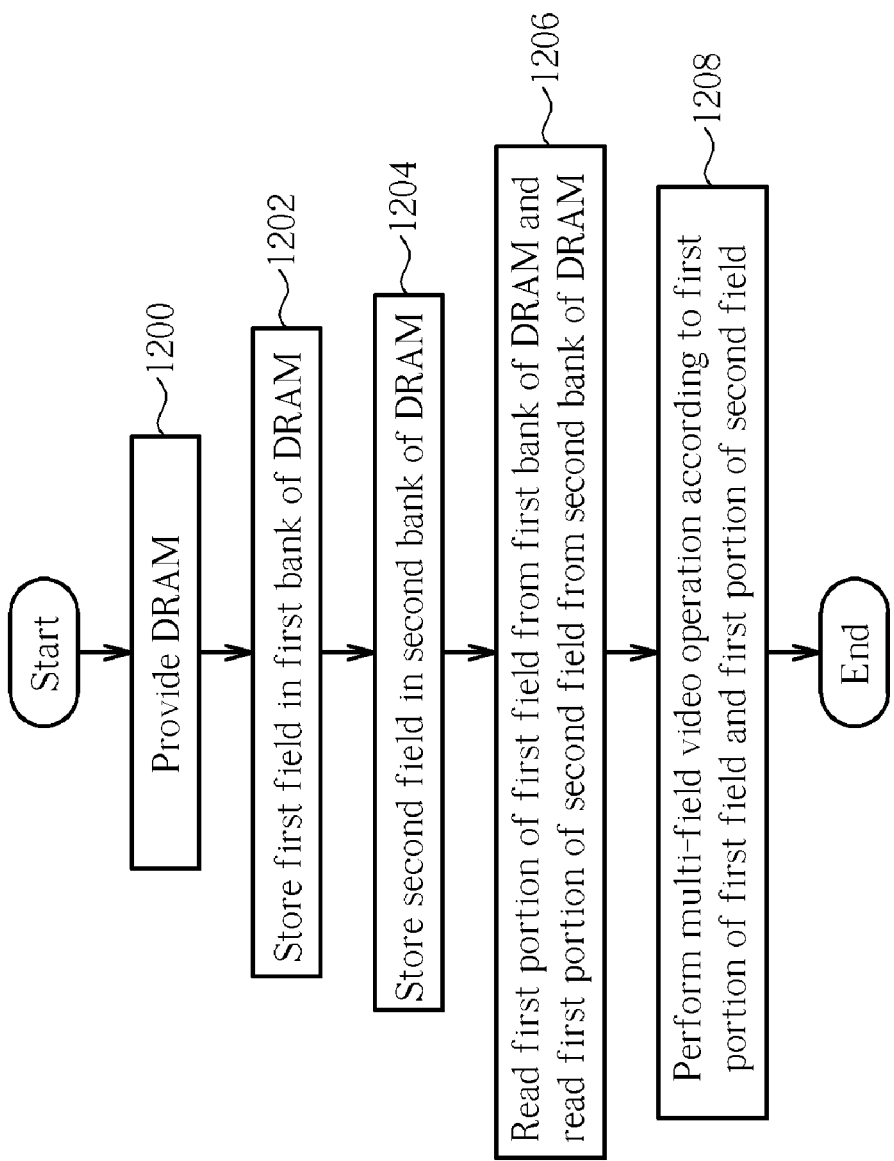
FIG. 12 shows a flowchart of storing and accessing pictures in multi-field video operations according to the embodiments of the present invention shown in FIG. 7 to FIG. 10.

FIG. 12 shows a method of storing and accessing pictures in multi-field video operations according to the embodiments of the present invention shown in FIG. 7 to FIG. 10. Provided that substantially the same result is achieved, the steps of the flowchart in FIG. 12 need not be in the exact order shown and need not be contiguous, that is, other steps can be intermediate. According to these embodiments, storing and accessing pictures in multi-field video operation includes the following steps:

Step 1200: Provide a dynamic random access memory (DRAM).

Step 1202: Store a first field in a first bank of the DRAM.

Step 1204: Store a second field in a second bank of the DRAM.

Step 1206: Read a first portion of the first field from the first bank of the DRAM and read a first portion of the second field from the second bank of the DRAM.

Step 1208: Perform the multi-field video operation according to the first portion of the first field and the first portion of the second field.

In addition to the above described methods of storing field pictures in DRAM memory, further consideration of memory controller design with reference to the above embodiments will allow a person skilled in the art to think of other embodiments. In general, memory controllers have at least one of the following three types of abilities:

1. When data stored in memory is required to be accessed for multi-field operation purposes, the memory controller only needs to open the needed memory banks once. The needed memory bank is activated according to the order of access of the field pictures.

2. During deinterlacing operations, the memory controller compares a next required memory access address with a current serving address. When the two addresses correspond to different banks, the memory controller can use the unoccupied resource of the memory control bus to perform a pre-charge, activation, and access etc operational commands for the bank of the next access address.

3. The memory controller includes one (or more than one) counter. When the counter indicates the need to switch banks, the memory controller can use the unoccupied resource of the memory control bus to perform a precharge, activate, and access etc operational command for the bank of the next field that is required to be accessed.

Note that in the forgoing description, the pre-charge command involves opening a particular bank or a particular set of banks of the memory, the activation command involves opening a particular page of a particular bank of the memory, and the access command involves performing a read or write operation to a particular opened page of a particular bank.

Concerning the above mentioned second aspect of the present invention, in some operations each color component needs to be expressed as a 10-bit datum. Traditional memory organization methods tend to make the memory not quite suitable to this organization. The problem with the traditional memory organizations has to do with the number of bits of a typical memory word. For example, 32-bit/64-bit/128-bit DRAM.

Figure 13:
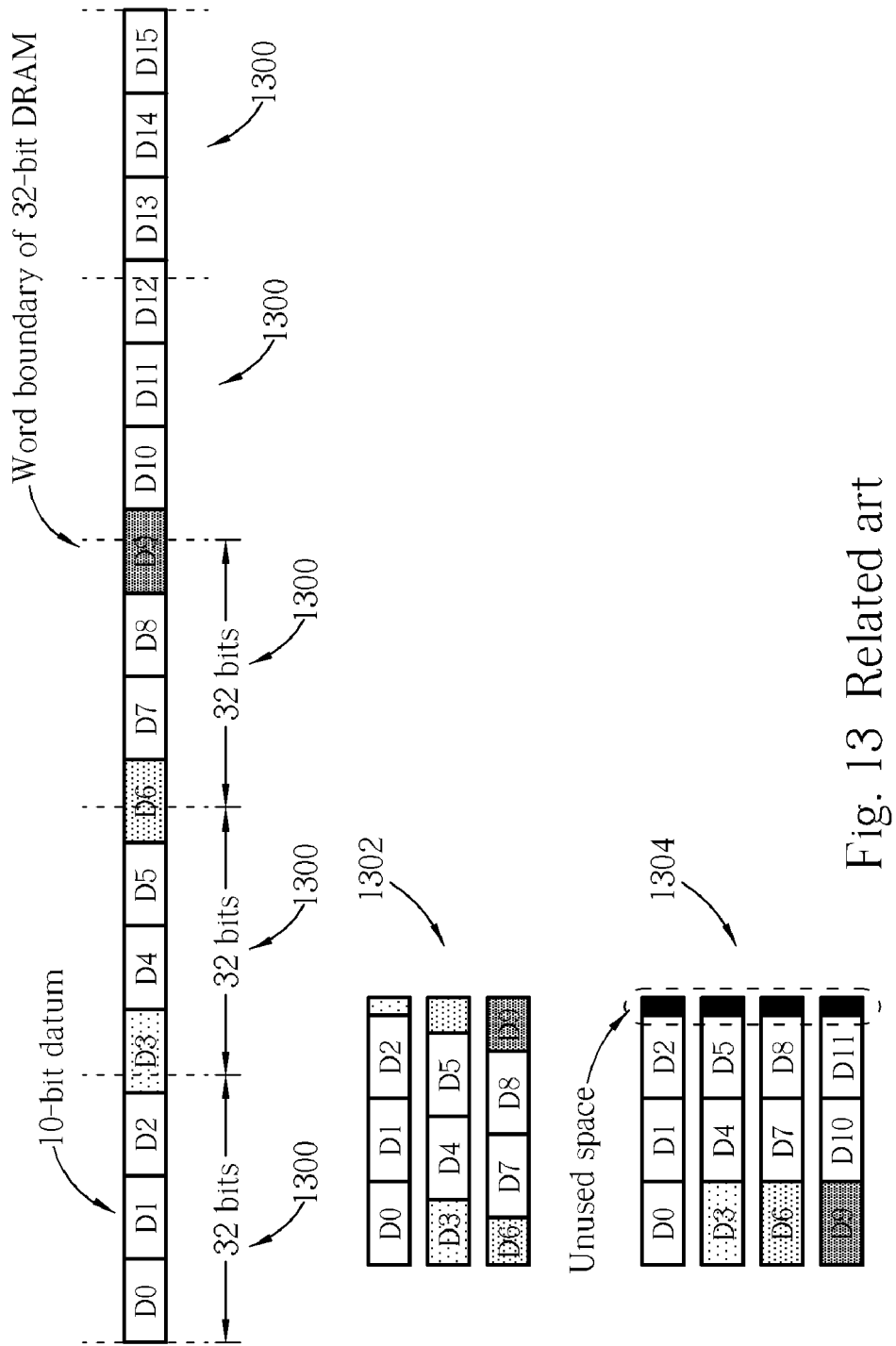
FIG. 13 shows traditional memory storage methods for packing 10-bit data into a 32-bit wide DRAM memory word.

FIG. 13 shows a traditional memory storage method for packing 10-bit data into a 32-bit wide DRAM memory word 1300. In order to store a 10-bit datum into DRAM, the data needs to be shifted and packed into the 32-bit wide memory word 1300. In this way the 10-bit data will be read from the DRAM memory word 1300 in the compact format 1302 and will need to be further processed in an SRAM and then read out from the SRAM. In this way, required memory bandwidth may exceed the available bandwidth of the memory system. This is because one 10-bit datum may be split across two different SRAM entries. Should an even larger DRAM be required, the storage process becomes increasingly complex. Additionally, if the same system is required to both support both 8-bit data and 10-bit data formats, the system design becomes very difficult. To simplify the design, the 10-bit data can be stored in the memory word 1300 in a simplified format 1304. In this format 1304, the 10-bit data words are aligned such that a data word starts at the beginning of each 32-bit word 1300. Although this organization greatly simplifies addressing logic, the efficiency of the memory storage is reduced because there are wasted (unused) bits at the end of each of the memory words 1300.

Figure 14:
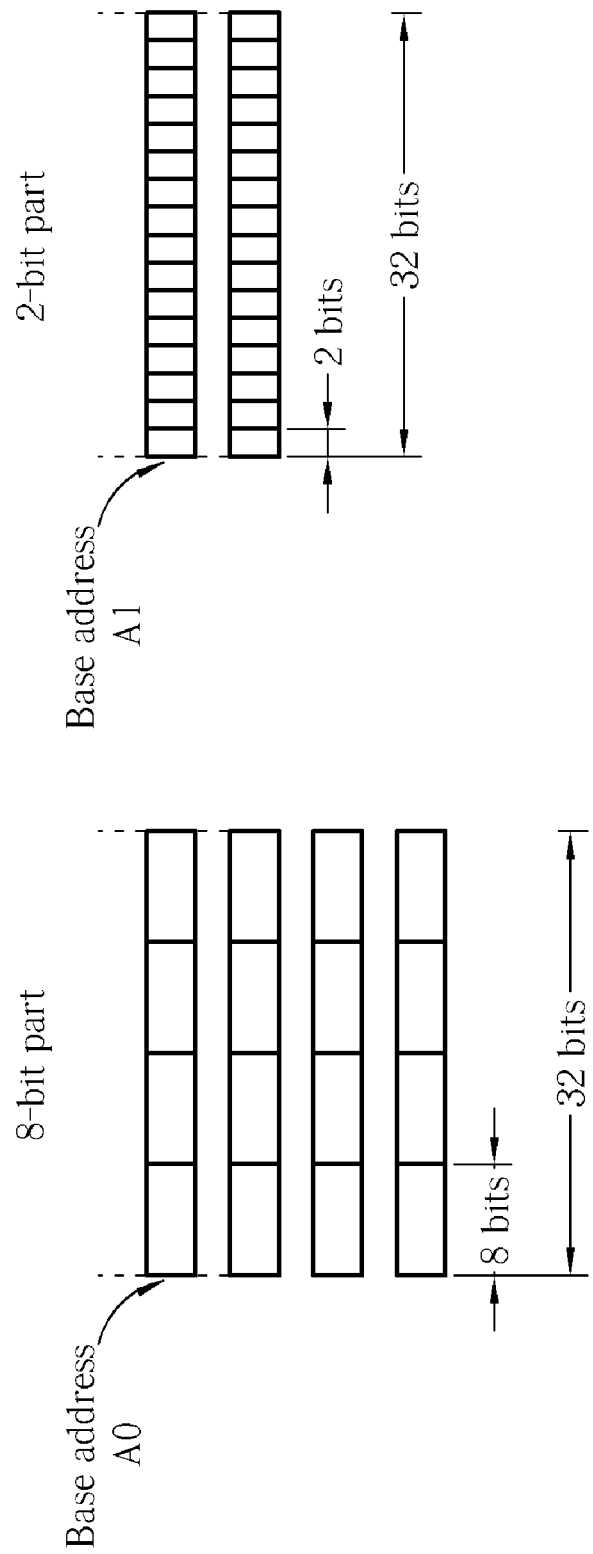
FIG. 14 shows a storage method of dividing a 10-bit color datum into an 8-bit part and a 2-bit part according to an exemplary embodiment of the present invention.
Figure 15:
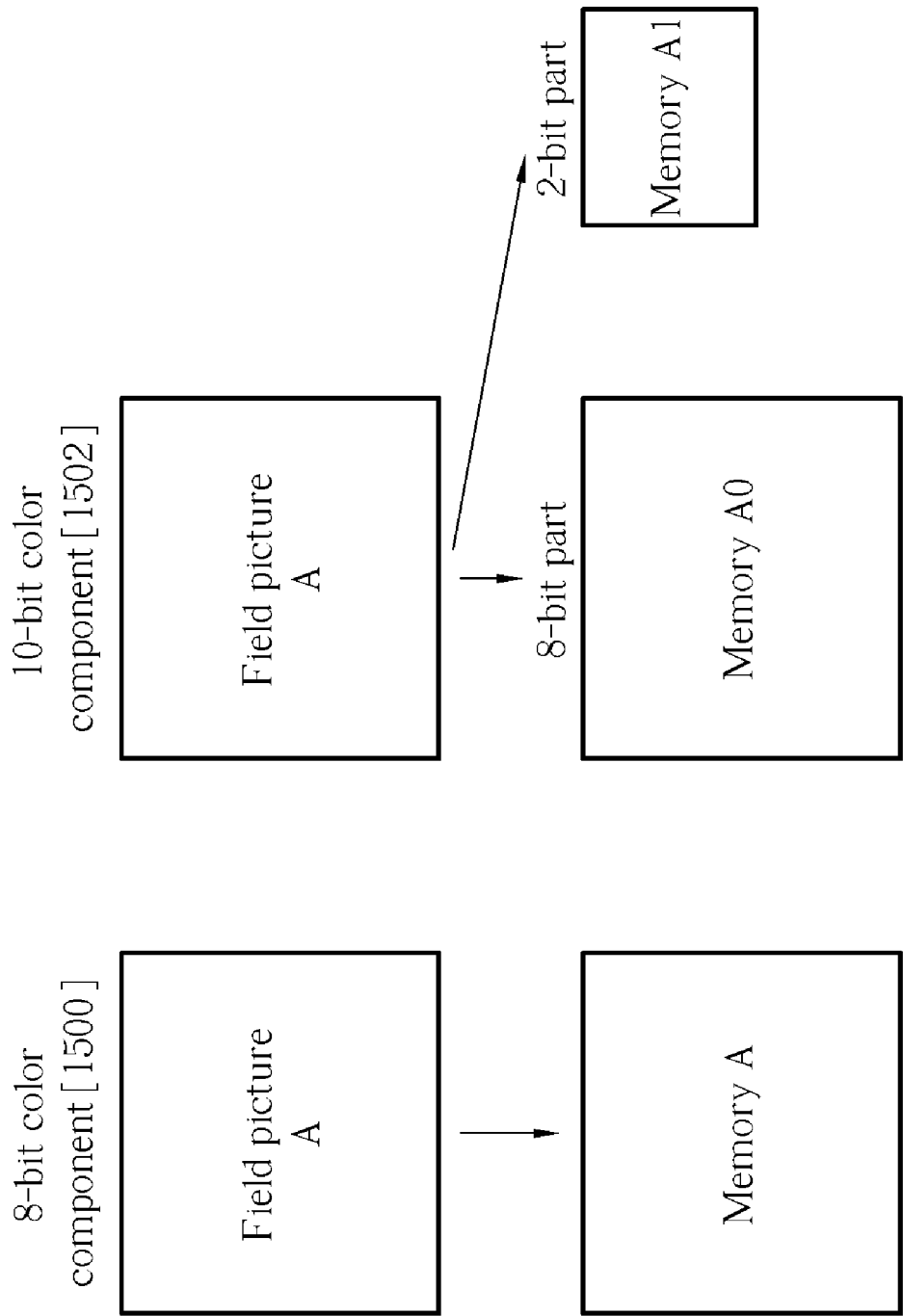
FIG. 15 shows an overall whole picture view of how an 8-bit color component of a field picture is stored directly into memory, and a 10-bit color component of the field picture is broken into two parts and stored in different memories according to the method of FIG. 14.

FIG. 14 shows a storage method of dividing a 10-bit color datum into an 8-bit part and a 2-bit part according to an exemplary embodiment of the present invention. FIG. 15 shows an overall whole picture view of how an 8-bit color component 1500 of a field picture A is stored directly into memory A, and a 10-bit color component 1502 of the field picture A is broken into two parts and stored in memories A0 and A1, respectively. Please note that although the following description is primarily written with respect to dynamic random access memory (DRAM) and static random access memory (SRAM), other memory types could also be employed in the storage method of the present invention. The present invention provides an effective and convenient organization and storage method to allow a 10-bit datum to be easily converted into two parts and stored in a 32-bit memory word. This allows the system design to be flexible—both 8-bit and 10-bit data color components are thereby equally easy to use. As shown in FIG. 14, in this embodiment, 10-bit data is divided into two parts: an 8-bit part (A0) and a 2-bit part (A1). For example, eight most significant bits (MSB) can be stored as the 8-bit part and two least significant bits (LSB) can be stored as the 2-bit part. Note that the MSB can first be completely read and then the LSB can be read. In some embodiments, an address generator can be utilized to access both the 8-bit and 2-bit parts by reloading an index address such as a base address, and a pixel counter (or the DRAM word count). The address generator thus derives addresses for accessing the two parts according to the reloaded values.

Figure 16:
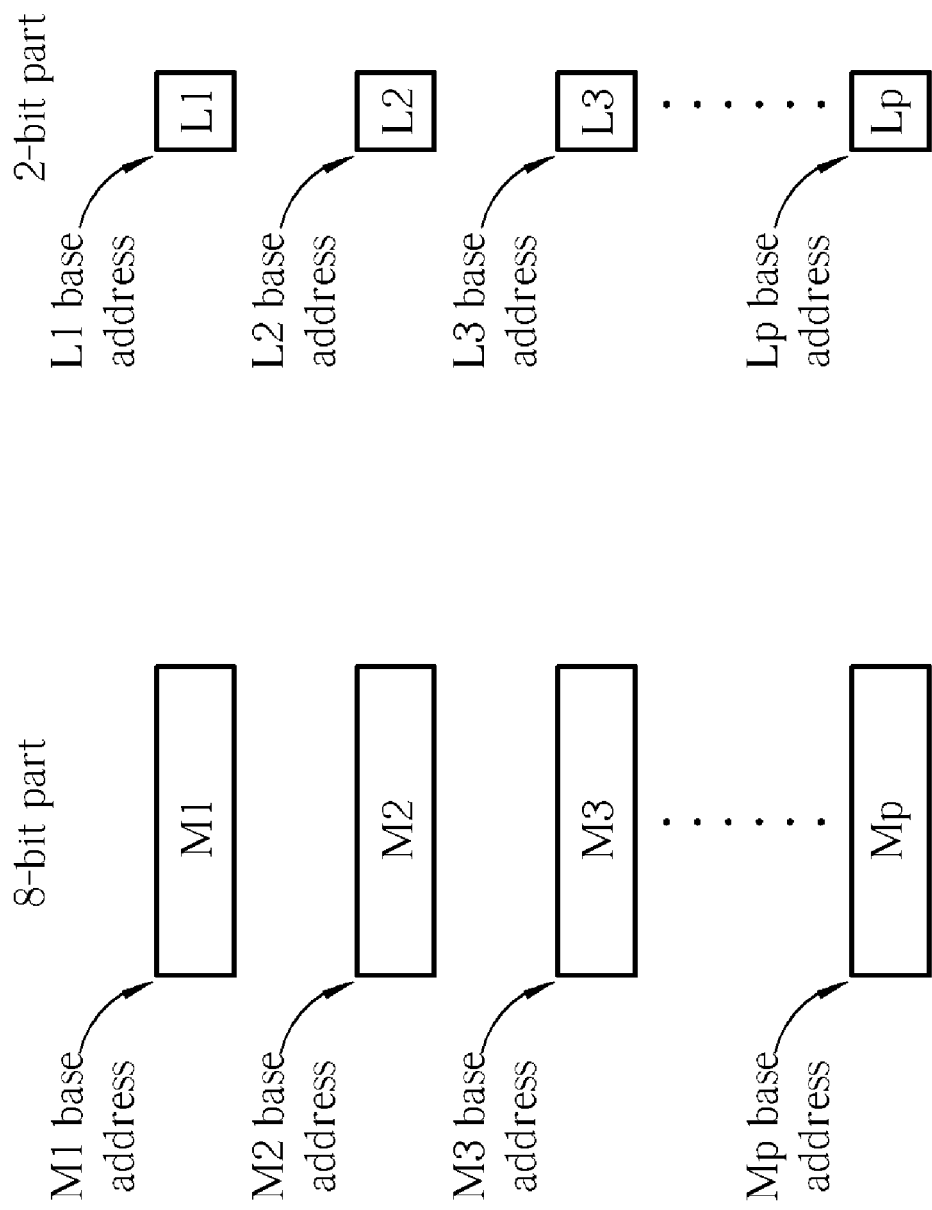
FIG. 16 shows how the 8-bit part and the 2-bits part of FIG. 14 can be further divided into smaller groups.

As shown in FIG. 16, the above described A0 part (8-bits in length) and the A1 part (2-bits in length) can be further divided into smaller groups. For example, in another embodiment, the A0 part is divided into p groups M1-Mp, and the A1 part is divided into p groups L1-Lp. Note that the base addresses of M1-Mp need not be continuous, and the base addresses of the L1-Lp groups need not be continuous. If the base addresses are continuous, then the result will be the same as shown in FIG. 15. In another embodiment, Mi and Li can be organized in an interlace fashion. Furthermore, the 8-bit part and the 2-bit part can be combined while utilizing the above described different memory bank method according to the present invention.

In addition to utilizing the above described method to organize the frame buffer, a local buffer of the processing unit can also be changed appropriately. By dividing the local buffer into two sections, the SRAM bandwidth requirements are reduced. When reading from the DRAM, because reading a 32-bit DRAM will return values for sixteen 2-bit datum units, unless the words of the SRAM could hold 16×10, multiple write cycles will need to be written to the SRAM. When using 64-bit/128-bit DRAM, the number of write cycles will be increased so the efficiency will be lowered. Note that utilizing two-port or multiple banks will possibly improve the SRAM bandwidth congestion problem.

Another advantage of dividing the parts into two separate SRAMs is that in this way performing design adjustments are much simpler. For example, when trying to make the design support both 10-bit and 8-bit modes, it is only required to disable or simply not use (not install) the 2-bit SRAM and the mode can be switched to 8-bits. Therefore, both manufacturing complexities and the controlling hardware are greatly simplified.

Figure 17:
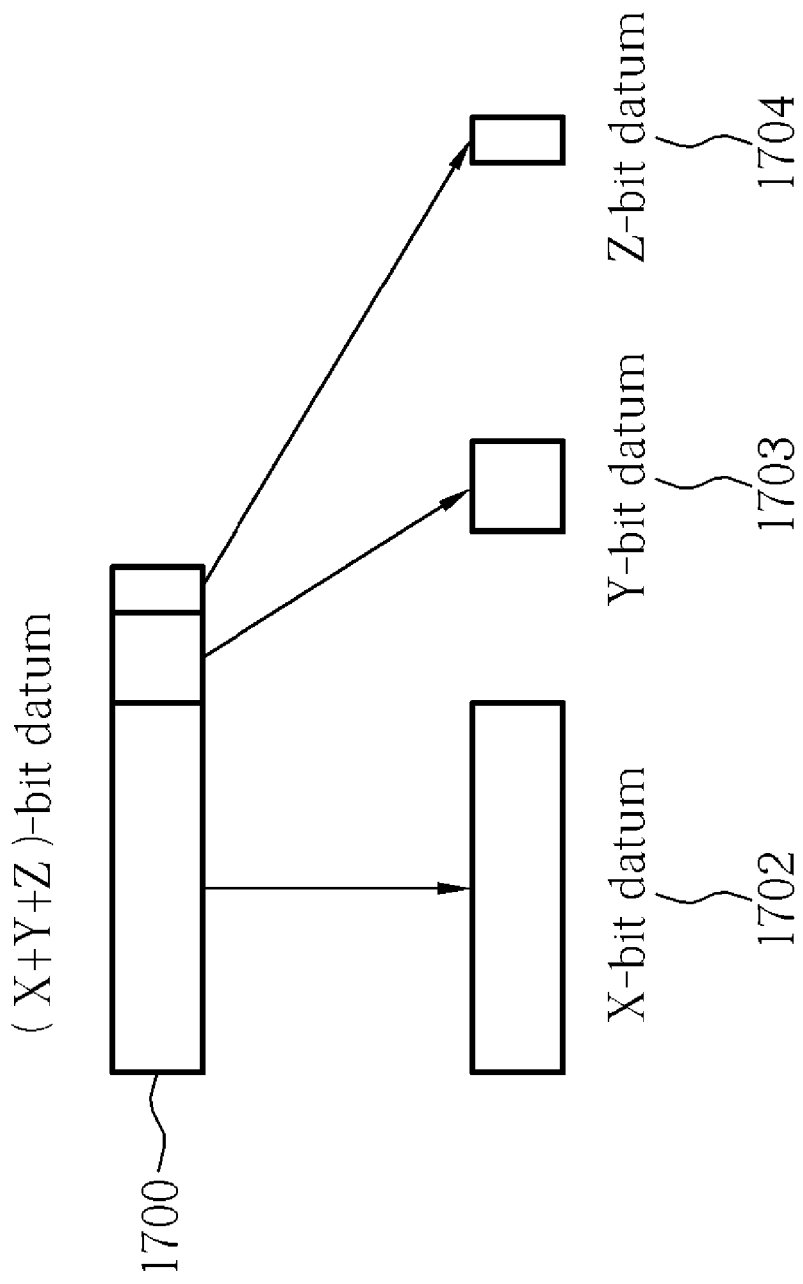
FIG. 17 shows dividing an n-bit datum into three parts according to another exemplary embodiment of the present invention.

FIG. 17 shows dividing an n-bit datum into three parts according to another exemplary embodiment of the present invention. The above described process of FIG. 14 involves dividing a 10-bit datum into two parts. However, further embodiments of the present invention involve splitting up an n-bit datum into a plurality of parts. Typically, the method will be useful for storing a non base-8 number into a base-8 DRAM memory word. For example, as shown in FIG. 17, an n-bit datum is divided into three parts. By making the number of bits in each part equal to 2 to the power of a non-negative integer (e.g., 1, 2, 4, 8, 16, . . . ), addressing calculations become trivial to perform.

Figure 18:
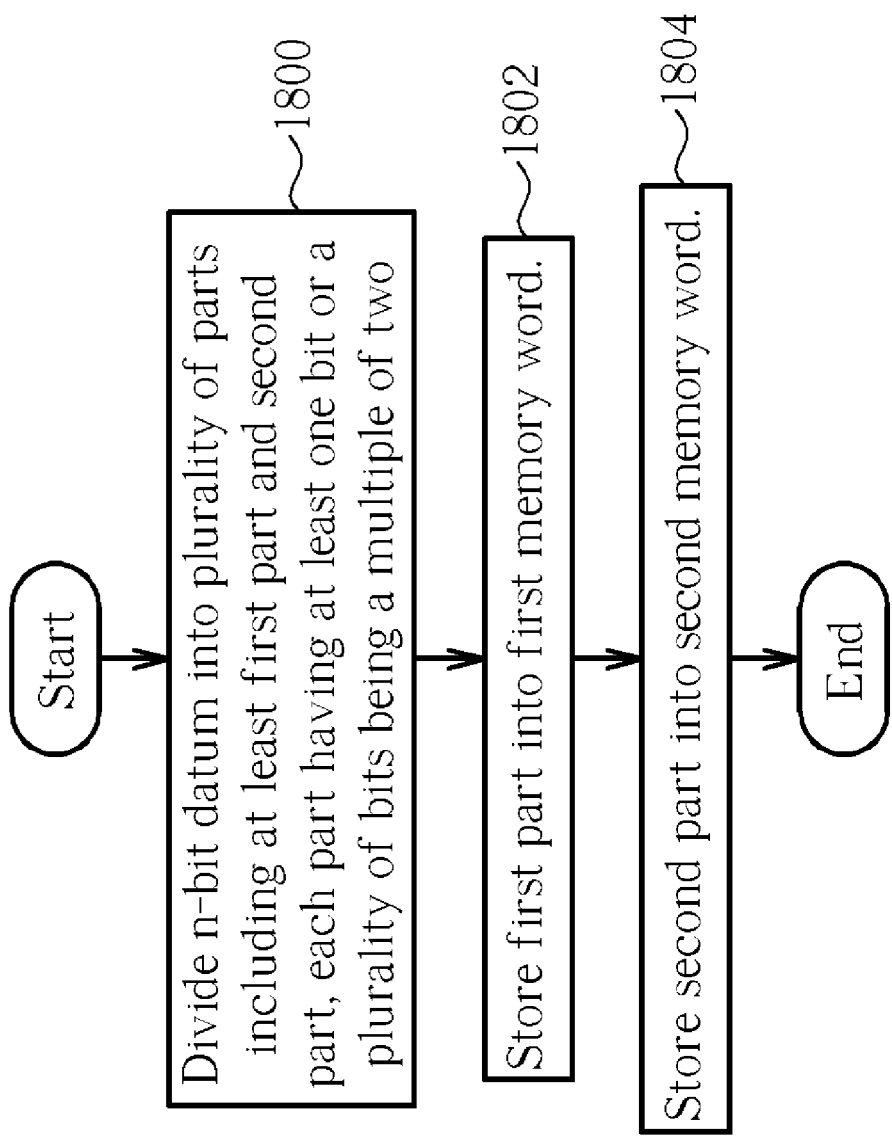
FIG. 18 shows a flowchart of storing n-bit data according to an embodiment of the present invention.

FIG. 18 shows a method of storing n-bit data according to an embodiment of the present invention. Provided that substantially the same result is achieved, the steps of the flowchart in FIG. 18 need not be in the exact order shown and need not be contiguous, that is, other steps can be intermediate. According to this embodiment, storing n-bit data includes the following steps:

Step 1800: Divide an n-bit datum into a plurality of parts including at least a first part and a second part, each part having at least one bit or a plurality of bits being a multiple of two.

Step 1802: Store the first part into a first memory word.

Step 1804: Store the second part into a second memory word.

As previously mentioned, according to different embodiments of the present invention as shown in FIG. 15, the different memories A, A0, A1 could also be implemented as different banks within the same memory module. Therefore, in alternative embodiments, steps 1802 and 1804 could comprise storing the first and second memory words within different memories, or within different memory banks.

According to the present invention, storing and accessing pictures in a multi-field video operation includes providing a dynamic random access memory (DRAM); storing a first portion of a first field in first page of a first bank of the DRAM; storing a first portion of a second field in the first page of the first bank; reading the first page of the first bank; and performing the multi-field video operation according to the first portion of the first field and the first portion of the second field. Alternatively, different banks can be utilized to store the first field and second fields. In another aspect of the present invention, a method for storing n-bit data includes dividing an n-bit datum into a plurality of parts including at least a first part and a second part, each part having at least one bit or a plurality of bits being a multiple of two; storing the first part into a first memory word; and storing the second part into a second memory word.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of accessing pictures, the method comprising:
   reading a first portion of a first field and a first portion of a second field being stored in a first page of a first bank of a memory, wherein the first field and the second field belong to different pictures;
   reading a second portion of the first field being stored in a second page of the first bank of the memory;
   reading a second portion of a second field being stored in the second page of the first bank; and
   performing a multi-field video operation according to the first portion and the second portion of the first field and the first portion and the second portion of the second field; wherein an address of the first portion of the first field has a corresponding relation with an address of the first portion of the second field, and the data read from the first page of the first bank for performing the multi-field video operation is accessed at once before accessing another page of the first bank.

2. The method of claim 1, wherein the multi-field video operation is a 25 de-interlacing operation.

3. The method of claim 1, wherein the multi-field video operation is a 3-dimensional (3d) comb filtering operation.

4. The method of claim 1, wherein the multi-field video operation is a temporal noise reduction operation.

5. The method of claim 1, wherein the multi-field video operation is an interpolation operation.

6. A method of storing and accessing pictures in a multi-field video operation, the method comprising:
   reading a first field being stored in a first bank of a memory;
   reading a second field being stored in a second bank of the memory;
   reading a third field being stored in a third bank of the memory; and
   performing the multi-field video operation according to the first portion of the first field, a first portion of the second field and a first portion of the third field; wherein an address of the first portion of the first field has a corresponding relation with an address of the first portion of the second field.

7. The method of claim 6, further comprising reading the first portion of the first field from the first bank and then reading the first portion of the second field from the second bank.

8. The method of claim 6, wherein the multi-field video operation is a de-interlacing operation.

9. The method of claim 6, wherein the multi-field video operation is a 3-dimensional (3d) comb filtering operation.

10. The method of claim 6, wherein the multi-field video operation is a temporal noise reduction operation.

11. The method of claim 6, wherein the multi-field video operation is an interpolation operation.

12. A method of accessing pictures, the method comprising:
   reading a first portion of a first field being stored in a first page of a first bank of a memory;
   reading a first portion of a second field being stored in the first page of the first bank;
   performing a multi-field video operation according to the first portion of the first field and the first portion of the second field; and
   reading a first portion of a third field being stored in a first page of a second bank of the memory;
   wherein the multi-field video operation is performed according to the first portion of the first, second, and third fields.

13. The method of claim 12, further comprising:
   reading the first page of the first bank and then reading the first page of the second bank to obtain data of the first field, the second field, and the third field; and
   performing the multi-field video operation further according to the data of the first field, the second field, and the third field.

14. A method of accessing pictures, the method comprising:
   reading a first portion of a first field being stored in a first page of a first bank of a memory;
   reading a first portion of a second field being stored in the first page of the first bank;
   performing a multi-field video operation according to the first portion of the first field and the first portion of the second field;
   reading a second portion of the first field being stored in a first page of a second bank of the memory;
   reading a second portion of the second field being stored in the first page of the second bank;

performing the multi-field video operation according to the first and second portions of the first field, and the first and second portions of the second field;

reading a third portion of the first field in a second page of the first bank;

reading a third portion of the second field in the second page of the first bank;

performing the multi-field video operation further according to the third portions of the first and second fields;

wherein data for performing the multi-field video operation is read from the memory according to the following order: the first portion of the first and second fields, the second portion of the first and second fields, and the third portion of the first and second fields.

15. A method of storing and accessing pictures in a multi-field video operation, the method comprising:

reading a first field being stored in a first bank of a memory;

reading a second field being stored in a second bank of the memory;

performing the multi-field video operation according to a first portion of a first field and the first portion of the second field;

reading a third field being stored in a third bank of the memory; and performing the multi-field video operation further according to the first portion of the third field.

16. A method of storing and accessing pictures in a multi-field video operation, the method comprising:

reading a first field being stored in a first bank of a memory;

reading a second field being stored in a second bank of the memory; and reading a first portion of a third field from the first bank; and performing the multi-field video operation according to a first portion of a first field, a first portion of the second field, and the first portion of the third field;

wherein data read from the same page of the first or second bank for performing the multi-field video operation is accessed at once before accessing another page;

wherein the first portion of the first and third fields are stored in different pages, and data for performing the multi-field video operation is accessed from the memory according to the following order: the first portion of the first field, the first potion of the second field, and the first portion of the third field.

17. The method of claim 1, wherein a part of the address of the first portion of the first field and a part of the address of the first portion of the second field are the same.

18. The method of claim 6, wherein a part of the address of the first portion of the first field and a part of the address of the first portion of the second field are the same.

19. A method of storing and accessing pictures in a multi-field video operation, the method comprising:

reading a first field being stored in a first bank of a memory;

reading a second field being stored in a second bank of the memory; and reading a first portion of the first field from the first bank and then reading a first portion of the second field from the second bank; and performing the multi-field video operation according to the first portion of the first field and the first portion of the second field; wherein an address of the first portion of the first field has a corresponding relation with an address of the first portion of the second field.

20. A method of storing and accessing pictures in a multi-field video operation, the method comprising:

reading a first field being stored in a first bank of a memory;

reading a second field being stored in a second bank of the memory; and reading a first portion of a third field from the first bank;

performing the multi-field video operation according to a first portion of the first field, a first portion of the second field and the first portion of the third field; wherein an address of the first portion of the first field has a corresponding relation with an address of the first portion of the second field, where data read from the same page of the first or second bank for performing the multi-field video operation is accessed at once before accessing another page.

21. The method of claim 20, wherein the first portion of the first and third fields are stored in different pages, and data for performing the multi-field video operation is accessed from the memory according to the following order: the first portion of the first field, the first potion of the second field, and the first portion of the third field.

22. A method of accessing pictures, the method comprising:

reading a first portion of a first field being stored in a first page of a first bank of a memory;

reading a first portion of a second field being stored in the first page of the first bank;

reading a first portion of a third field being stored in a first page of a second bank of the memory; and performing a multi-field video operation according to the first portion of the first, second, and third fields, wherein an address of the first portion of the first field has a corresponding relation with an address of the first portion of the second field.

23. The method of claim 22, further comprising:

reading the first page of the first bank and then reading the first page of the second bank to obtain data of the first field, the second field, and the third field; and performing the multi-field video operation further according to the data of the first field, the second field, and the third field.

24. A method of accessing pictures, the method comprising:

reading a first portion of a first field being stored in a first page of a first bank of a memory;

reading a first portion of a second field being stored in the first page of the first bank;

reading a second portion of the first field being stored in a first page of a second bank of the memory;

reading a second portion of the second field being stored in the first page of the second bank;

reading a third portion of the first field in the second page of the first bank;

reading a third portion of the second field in the second page of the first bank; and performing a multi-field video operation according to the first portions of the first and second fields, the second portions of the first and second fields, and the third portions of the first and second fields;

wherein an address of the first portion of the first field has a corresponding relation with an address of the first portion of the second field;

wherein data for performing the multi-field video operation is read from the memory according to the following order: the first portion of the first and second fields, the second portion of the first and second fields, and the third portion of the first and second fields.

* * * * *